(12) United States Patent
Lee et al.

(10) Patent No.: US 12,042,789 B2
(45) Date of Patent: Jul. 23, 2024

(54) CATALYST FOR EXHAUST GAS PURIFICATION AND MANUFACTURING METHOD THEREOF

(71) Applicants: HYUNDAI MOTOR COMPANY, Seoul (KR); KIA CORPORATION, Seoul (KR); Korea University Research and Business Foundation, Seoul (KR)

(72) Inventors: Kwan Young Lee, Seoul (KR); Dalyoung Yoon, Seongnam-si (KR); Hyoseong Woo, Seoul (KR); Eun Jun Lee, Seoul (KR); Haney Park, Seoul (KR); Hyun Wook Jung, Seoul (KR)

(73) Assignees: HYUNDAI MOTOR COMPANY, Seoul (KR); KIA CORPORATION, Seoul (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/072,985

(22) Filed: Dec. 1, 2022

(65) Prior Publication Data
US 2023/0278019 A1 Sep. 7, 2023

(30) Foreign Application Priority Data
Mar. 7, 2022 (KR) .......................... 10-2022-0028465

(51) Int. Cl.
*B01J 21/04* (2006.01)
*B01D 53/94* (2006.01)
(Continued)

(52) U.S. Cl.
CPC ............ *B01J 35/19* (2024.01); *B01D 53/945* (2013.01); *B01J 21/04* (2013.01); *B01J 23/44* (2013.01); *B01J 23/464* (2013.01); *B01J 37/0205* (2013.01); *B01J 37/04* (2013.01); *B01J 37/08* (2013.01); *B01D 2255/1021* (2013.01);
(Continued)

(58) Field of Classification Search
CPC . B01J 21/04; B01J 21/06; B01J 21/063; B01J 21/066; B01J 21/08; B01J 21/10; B01J 21/12; B01J 21/14; B01J 23/42; B01J 23/44; B01J 23/464; B01J 23/56; B01J 23/63; B01J 35/0006; B01J 37/0205; B01J 37/04; B01J 37/08; B01J 35/19; B01D 53/945
See application file for complete search history.

(56) References Cited

U.S. PATENT DOCUMENTS 4,140,655 A * 2/1979 Chabot ................ B01J 23/6567
502/303
4,369,132 A 1/1983 Kinoshita et al.
(Continued)

FOREIGN PATENT DOCUMENTS

JP 2014168764 A 9/2014

*Primary Examiner* — Cam N. Nguyen
(74) *Attorney, Agent, or Firm* — Lempia Summerfield Katz LLC

(57) ABSTRACT

A catalyst for purifying exhaust gas includes a first catalyst including a first metal oxide on which platinum (Pt) and rhodium (Rh) are supported, and a second catalyst including a second metal oxide on which palladium (Pd) and platinum (Pt) are supported, wherein the first catalyst and the second catalyst are physically mixed.

12 Claims, 1 Drawing Sheet

(51) Int. Cl.
  *B01J 21/06*  (2006.01)
  *B01J 21/08*  (2006.01)
  *B01J 21/10*  (2006.01)
  *B01J 21/12*  (2006.01)
  *B01J 21/14*  (2006.01)
  *B01J 23/42*  (2006.01)
  *B01J 23/44*  (2006.01)
  *B01J 23/46*  (2006.01)
  *B01J 23/56*  (2006.01)
  *B01J 23/63*  (2006.01)
  *B01J 35/00*  (2024.01)
  *B01J 37/02*  (2006.01)
  *B01J 37/04*  (2006.01)
  *B01J 37/08*  (2006.01)
  *F01N 3/10*   (2006.01)
  *F01N 3/28*   (2006.01)

(52) U.S. Cl.
  CPC ............... *B01D 2255/1023* (2013.01); *B01D 2255/1025* (2013.01); *F01N 3/101* (2013.01); *F01N 3/2803* (2013.01); *F01N 2370/02* (2013.01)

(56) References Cited

U.S. PATENT DOCUMENTS

| | | | | |
|---|---|---|---|---|
| 5,019,546 | A * | 5/1991 | Murakami | B01D 53/945 502/303 |
| 6,087,298 | A * | 7/2000 | Sung | F01N 3/2803 502/328 |
| 6,875,725 | B2 * | 4/2005 | Lindner | B01J 35/006 502/328 |
| 8,551,908 | B2 * | 10/2013 | Satou | B01J 23/63 502/262 |
| 8,950,174 | B2 * | 2/2015 | Hilgendorff | B01J 35/023 60/299 |
| 10,626,765 | B2 * | 4/2020 | Inoda | F01N 3/0222 |
| 10,801,382 | B2 * | 10/2020 | Ochiai | F01N 3/035 |
| 11,260,372 | B2 * | 3/2022 | Xue | B01J 37/0242 |
| 2017/0312691 | A1 * | 11/2017 | Sato | B01J 23/44 |
| 2018/0280878 | A1 * | 10/2018 | Inoda | B01D 53/864 |
| 2021/0301698 | A1 * | 9/2021 | Armitage | B01J 37/12 |
| 2021/0339228 | A1 * | 11/2021 | Dumbuya | B01J 35/04 |
| 2022/0193639 | A1 * | 6/2022 | Vjunov | B01J 37/0244 |

* cited by examiner

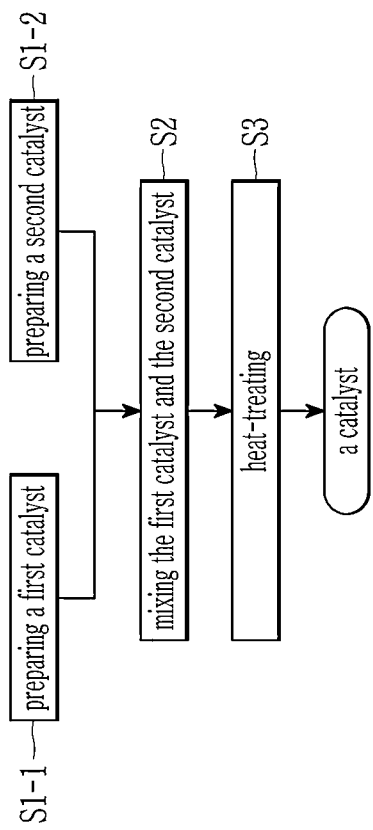

CATALYST FOR EXHAUST GAS PURIFICATION AND MANUFACTURING METHOD THEREOF

CROSS-REFERENCE TO RELATED APPLICATION

This application claims priority to and the benefit of Korean Patent Application No. 10-2022-0028465 filed in the Korean Intellectual Property Office on Mar. 7, 2022, the entire contents of which are incorporated herein by reference.

BACKGROUND (a) Field

The present disclosure relates to a catalyst for purifying exhaust gas that can be used as a three-way catalyst for gasoline vehicles and a method for manufacturing the same.

(b) Description of the Related Art

Exhaust gas from gasoline vehicles is purified by a three-way catalyst (TWC), wherein the catalyst has purification performance near to almost 100% at a catalyst temperature of the of greater than or equal to about 400° C. Because the three-way catalyst may not normally work in a cold-start section immediately after starting an engine, the exhaust gas is not purified but discharged into the air.

As vehicle exhaust gas regulations are strengthened, development of a three-way catalyst with excellent performance in the cold-start section is required.

In particular, because the catalyst is deactivated by exposure to the exhaust gas at a high temperature when driving a vehicle, a catalyst with improved heat resistance is required.

In addition, because of the sharp price rise of palladium (Pd) used in the three-way catalyst, a content of the palladium is reduced to strengthen cost competitiveness.

SUMMARY

One aspect is to provide a catalyst for purification of exhaust gas having improved purification performance of gasoline exhaust gas, improved durability without degradation of performance even after heat treatment, and an effect of reducing a cost.

Another aspect is to provide a method for manufacturing a catalyst for purifying exhaust gas.

According to an aspect, a catalyst for purifying exhaust gas includes a first catalyst including a first metal oxide on which platinum (Pt) and rhodium (Rh) are supported, and a second catalyst including a second metal oxide on which palladium (Pd) and platinum (Pt) are supported, wherein the first catalyst and the second catalyst are physically mixed.

The first metal oxide and the second metal oxide may each independently be aluminum oxide ($Al_2O_3$), titanium dioxide ($TiO_2$), silicon dioxide ($SiO_2$), zirconium dioxide ($ZrO_2$), tin oxide ($SnO_2$), tantalum oxide ($Ta_2O_5$), hafnium oxide ($HfO_2$), lanthanum oxide ($La_2O_3$), vanadium pentoxide ($V_2O_5$), cerium oxide ($CeO_2$), iron oxide ($Fe_2O_3$), chromium oxide ($Cr_2O_3$), molybdenum trioxide ($MoO_3$), zinc oxide (ZnO), magnesium oxide (MgO), tungsten trioxide ($WO_3$), or a combination thereof.

The platinum and rhodium of the first catalyst and the palladium and platinum of the second catalyst may not be supported together on one metal oxide.

The first catalyst may include 0.2 wt. % to 4.0 wt. % of platinum based on the total weight of the first catalyst.

The first catalyst may include 0.1 wt. % to 1.0 wt. % of rhodium based on the total weight of the first catalyst.

The second catalyst may include 0.2 wt. % to 4.0 wt. % of palladium based on the total weight of the second catalyst.

The second catalyst may include 0.2 wt. % to 4.0 wt. % of platinum based on the total weight of the second catalyst.

The first catalyst and the second catalyst may be mixed in a weight ratio of greater than 1:0 to less than 1:2.

The catalyst for purifying exhaust gas may include platinum and palladium in a weight ratio of greater than 1:0 to less than 1:2.

The catalyst for purifying exhaust gas may be one that is heat-treated at a temperature in a range of 800° C. to 1100° C. for 5 hours to 500 hours after the first catalyst and the second catalyst are physically mixed.

According to another aspect, a method of manufacturing a catalyst for purifying exhaust gas includes supporting platinum (Pt) and rhodium (Rh) on a first metal oxide to prepare a first catalyst, supporting palladium (Pd) and platinum (Pt) on a second metal oxide to prepare a second catalyst, and physically mixing the first catalyst and the second catalyst.

The preparing of the first catalyst may be accomplished by impregnating the first metal oxide in a solution including a precursor of platinum and a precursor of rhodium and calcining.

The preparing of the second catalyst may be accomplished by impregnating a second metal oxide in a solution including a precursor of palladium and a precursor of platinum and calcining.

The calcining may be performed at a temperature in a range of 300° C. to 700° C. for 2 hours to 24 hours.

After physically mixing the first catalyst and the second catalyst, heat-treating may be performed at a temperature in a range of 800° C. to 1100° C. for 5 hours to 500 hours.

The catalyst for purifying exhaust gas according to one aspect has improved purification performance of gasoline exhaust gas, improved durability without degradation of performance even after heat treatment, and an effect of reducing a cost.

BRIEF DESCRIPTION OF THE DRAWINGS

The FIGURE depicts a process flowchart illustrating a method of manufacturing a catalyst for purifying exhaust gas according to one aspect.

DETAILED DESCRIPTION OF THE EMBODIMENTS

The advantages and features of the present disclosure and the methods for accomplishing the same are apparent from the embodiments described hereinafter with reference to the accompanying drawings. However, an implemented form may not be limited to exemplary embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise," and variations such as "comprises" or "comprising," are understood to imply the inclusion of stated elements but not the exclusion of any other elements.

Further, the singular includes the plural unless mentioned otherwise.

A catalyst for purifying exhaust gas according to one aspect (hereinafter, also referred to as a "catalyst") includes a physically mixed first catalyst and a second catalyst.

The first catalyst includes a first metal oxide on which platinum (Pt) and rhodium (Rh) are supported, and the second catalyst includes a second metal oxide on which palladium (Pd) and platinum (Pt) are supported.

The first metal oxide and the second metal oxide may each independently be $Al_2O_3$, $TiO_2$, $SiO_2$, $ZrO_2$, $SnO_2$, $Ta_2O_5$, $HfO_2$, $La_2O_3$, $V_2O_5$, $CeO_2$, $Fe_2O_3$, $Cr_2O_3$, $MoO_3$, $ZnO$, $MgO$, $WO_3$, or a combination thereof and may include, for example, alumina-silica, alumina-titania, alumina-zirconia, silica-titania, silica-zirconia, titania-zirconia, or alumina-magnesia.

For example, the first metal oxide and the second metal oxide may each independently include $Al_2O_3$. The $Al_2O_3$ may include $\theta$-$Al_2O_3$, $\gamma$-$Al_2O_3$, $\alpha$-$Al_2O_3$, $\eta$-$Al_2O_3$, $\delta$-$Al_2O_3$, $\kappa$-$Al_2O_3$, or a mixture thereof.

The first metal oxide and the second metal oxide may each independently have a specific surface area in a range of 55 $m^2/g$ to 140 $m^2/g$. When the first metal oxide or the second metal oxide has a specific surface area of less than 55 $m^2/g$, a dispersion degree of active metals may be lowered, but when the specific surface area is greater than 140 $m^2/g$, side reactivity may be increased.

The first catalyst may include 0.2 wt. % to 4.0 wt. % of platinum based on the total weight of the first catalyst. When the content of platinum is less than 0.2 wt. %, catalyst active sites may decrease and thus the activity of the entire catalyst may decrease, and when the content of platinum exceeds 4.0 wt. %, an efficiency of the catalyst may decrease due to a sintering phenomenon.

The first catalyst may include rhodium in an amount of 0.1 wt. % to 1.0 wt. %, for example 0.2 wt. % to 0.6 wt. % based on the total weight of the first catalyst. When the content of rhodium is less than 0.1 wt. %, catalyst active sites may decrease and thus the activity of the entire catalyst may decrease, and when the content of rhodium exceeds about 1.0 wt. %, an efficiency of the catalyst may decrease due to the sintering phenomenon.

The second catalyst may include 0.2 wt. % to 4.0 wt. % of palladium based on the total weight of the second catalyst. When the content of palladium is less than 0.2 wt. %, catalyst active sites may decrease and thus the activity of the entire catalyst may decrease, and when the content of palladium exceeds 4.0 wt. %, an efficiency of the catalyst may decrease due to a sintering phenomenon.

The second catalyst may include platinum in an amount of 0.2 wt. % to 4.0 wt. %, for example 0.6 wt. % to 4.0 wt. % based on the total weight of the second catalyst. When the content of platinum is less than 0.2 wt. %, catalyst active sites may decrease and thus the activity of the entire catalyst may decrease, and when the content of platinum exceeds about 4.0 wt. %, an efficiency of the catalyst may decrease due to a sintering phenomenon.

As described below, because the catalyst for purifying exhaust gas is manufactured by supporting platinum and rhodium on a first metal oxide to prepare a first catalyst, supporting palladium and platinum on a second metal oxide to prepare a second catalyst, then physically mixing the first catalyst and the second catalyst, the platinum and rhodium of the first catalyst and the palladium and platinum of the second catalyst may not be supported together on one metal oxide. That is, the catalyst for purifying exhaust gas is different from a catalyst in which platinum, rhodium and palladium are supported on one metal oxide.

When palladium and rhodium are supported together on one metal oxide, exhaust gas purification performance may deteriorate during the heat treatment. In addition, when platinum alone is supported on the metal oxide, the exhaust gas purification performance may deteriorate during the heat treatment of the catalyst. On the contrary, when palladium and rhodium are respectively supported on the first metal oxide and the second metal oxide, and then, platinum is additionally supported on the first metal oxide and the second metal oxide, excellent gasoline exhaust gas purification performance may be secured, and due to no performance degradation after the heat treatment, excellent durability may be achieved, and in addition, there is a cost reduction effect by decreasing the content of palladium and using platinum instead.

The first catalyst and the second catalyst may be mixed in a weight ratio of greater than 1:0 to less than 1:2, for example, 1:0.2 to 1:1.5. When the weight ratio of the second catalyst is greater than or equal to 1:2, the cost may increase as the content of rhodium increases.

The catalyst for purifying exhaust gas may include platinum and palladium in a weight ratio of greater than 1:0 to less than 1:2, for example, 1:0.2 to 1:1.57. When the weight ratio of palladium is greater than or equal to 1:2, the activity of the catalyst may decrease according to the change of the active point.

As described below, the catalyst for purifying exhaust gas may be one that is heat-treated at a temperature in a range of 800° C. to 1100° C. for 5 hours to 500 hours after the first catalyst and the second catalyst are physically mixed. The catalyst for purifying exhaust gas exhibits no performance degradation after the heat treatment and thus excellent durability, as palladium and rhodium are respectively supported on the first metal oxide and the second metal oxide, and then, platinum is additionally supported on the first metal oxide and the second metal oxide.

The FIGURE depicts a process flowchart illustrating a method of manufacturing a catalyst for purifying exhaust gas according to one aspect.

In the method for manufacturing a catalyst for purifying exhaust gas depicted within the FIGURE, a first catalyst may be prepared, a second catalyst may be prepared, and then the first catalyst and the second catalyst may be physically mixed.

The first catalyst may be prepared by supporting platinum (Pt) and rhodium (Rh) on the first metal oxide (S1).

For example, the preparing of the first catalyst may be accomplished by impregnating the first metal oxide in a solution including a precursor of platinum and a precursor of rhodium and calcining.

The precursor of platinum may be nitrate, hydrochloride, acetate, sulfate, or hydroxide of platinum, and for example, the precursor of platinum may be $K_2PtCl_4 \cdot 6H_2O$.

The solution including the precursor of platinum may be prepared by adding the precursor of platinum to a solvent. For example, the solvent may include distilled water, deionized water, ethanol, methanol, ethylene glycol, propylene glycol, isopropyl alcohol, or a mixture thereof.

The precursor of rhodium may be nitrate, hydrochloride, acetate, sulfate, or a hydroxide of rhodium. For example, the precursor of rhodium may be $RhCl_3 \cdot x(H_2O)$.

The solution including the precursor of rhodium may be prepared by adding the precursor of rhodium to a solvent. For example, the solvent may include distilled water, deionized water, ethanol, methanol, ethylene glycol, propylene glycol, isopropyl alcohol, or a mixture thereof.

Optionally, after impregnating the first metal oxide in a solution including the precursor of platinum and the precursor of rhodium, it may be dried.

For example, the drying may be performed at a temperature in a range of 40° C. to 120° C. for 12 hours to 72 hours after putting an impregnation solution in a rotary evaporator to remove moisture. When the drying temperature is less than 40° C., moisture included in nanoparticle pores may not be sufficiently dried, but when the drying temperature is greater than 120° C., nanoparticle structures may collapse. When the drying time is less than 12 hours, the moisture included in the nanoparticle pores may not be sufficiently dried, but when the drying time is greater than 72 hours, the nanoparticle structures may collapse.

The calcining may be performed at a temperature in a range of 300° C. to 700° C. for 2 hours to 24 hours. When the calcining temperature is less than about 300° C., chlorine included in the precursors may not be completely removed, but when the calcining temperature is greater than 700° C., the catalyst may be sintered. When the calcining time is less than 2 hours, the chlorine included in the precursors may not be completely removed, but when the calcining time is greater than 24 hours, the catalyst may be sintered.

However, the method of impregnating the first metal oxide in the solution including the platinum precursor and the rhodium precursor is illustrated in detail, but the first catalyst may be prepared by impregnating the first metal oxide in a solution including the platinum precursor, impregnating the first metal oxide treated with the platinum precursor in a solution including the rhodium precursor, and calcining it or alternatively by impregnating the first metal oxide in the solution including the rhodium precursor, impregnating the first metal oxide treated with the rhodium precursor in the solution including the platinum precursor, and calcining it.

The second catalyst may be prepared by supporting palladium (Pd) and platinum (Pt) on a second metal oxide (S2).

For example, the second catalyst may be prepared by impregnating the second metal oxide in a solution including a palladium precursor and a platinum precursor and calcining it.

The palladium precursor may be nitrate, hydrochloride, acetate, sulfate, or hydroxide of palladium, for example, $K_2PdCl_4 \cdot 6H_2O$.

The solution including the palladium precursor may be prepared by adding the palladium precursor to a solvent. For example, the solvent may include distilled water, deionized water, ethanol, methanol, ethylene glycol, propylene glycol, isopropyl alcohol, or a mixture thereof.

The precursor of platinum may be nitrate, hydrochloride, acetate, sulfate, or hydroxide of platinum, for example, $K_2PtCl_4 \cdot 6H_2O$.

A solution including the platinum precursor may be prepared by adding the platinum precursor in a solvent. For example, the solvent may include distilled water, deionized water, ethanol, methanol, ethylene glycol, propylene glycol, isopropyl alcohol, or a mixture thereof.

Optionally, the second metal oxide may be impregnated in a solution including the palladium precursor and the platinum precursor and then dried.

For example, the drying may be performed at a temperature in a range of 40° C. to 120° C. for 12 hours to 72 hours after putting the impregnation solution in a rotary evaporator to remove moisture. When the drying temperature is less than 40° C., moisture included in nanoparticle pores may not be sufficiently dried, but when the drying temperature is greater than 120° C., nanoparticle structures may collapse. When the drying time is less than 12 hours, the moisture included in the nanoparticle pores may not be sufficiently dried, but when the drying time is greater than 72 hours, the nanoparticle structures may collapse.

The calcining may be performed at a temperature in a range of 300° C. to 700° C. for 2 hours to 24 hours. When the calcining temperature is less than 300° C., chlorine included in the precursors may not be completely removed, but when the calcining temperature is greater than 700° C., the catalyst may be sintered. When the calcining time is less than 2 hours, the chlorine included in the precursors may not be completely removed, but when the calcining time is greater than 24 hours, the catalyst may be sintered.

However, the method of impregnating the second metal oxide in the solution including the palladium precursor and the platinum precursor is illustrated in detail, but the second catalyst may be prepared by impregnating the first metal oxide in a solution including the palladium precursor, impregnating the first metal oxide treated with the palladium precursor in a solution including the platinum precursor, and calcining the impregnated solution, or alternatively by impregnating the second metal oxide in the solution including the palladium precursor, impregnating the second metal oxide treated with the palladium precursor in the solution including the platinum precursor, and calcining the impregnated solution.

The first catalyst and the second catalyst are physically mixed to manufacture the catalyst for purifying exhaust gas (S3).

For example, the physical mixing of the first catalyst and the second catalyst may be performed for 1 minute to 5 minutes. When the physical mixing time is less than 1 minute, the catalysts may not be well mixed, obtaining a non-uniform composition.

After physically mixing the first catalyst and the second catalyst, heat treatment may be performed (S4).

The catalyst for purifying exhaust gas exhibits no performance degradation after the heat treatment and thus secures excellent durability by supporting palladium and rhodium respectively on the first metal oxide and the second metal oxide and additionally supporting platinum on the first metal oxide and the second metal oxide.

For example, the heat treatment may be performed at a temperature in a range of 800° C. to 1100° C. for 5 hours to 500 hours. When the heat treatment temperature is less than 800° C., the catalyst may not meet the evaluation conditions for heat resistance at a high temperature when driving a vehicle, but when the heat treatment temperature is greater than 1100° C., the catalyst may be sintered. When the heat treatment time is less than 5 hours, the catalyst may not meet the evaluation conditions for heat resistance at a high temperature, when driving a vehicle, but when heat treatment time is greater than 500 hours, the catalyst may be sintered.

Hereinafter, specific examples are described. However, the examples described below are for illustrative purposes only, and the scope of the disclosure is not limited thereto.

PREPARATION EXAMPLE: MANUFACTURE OF CATALYST FOR PURIFYING EXHAUST GAS

Example 1

A platinum precursor, $K_2PtCl_4 \cdot 6H_2O$, is mixed with distilled water, preparing a first-1 precursor solution. In addition, a rhodium precursor, $RhCl_3 \cdot x(H_2O)$ (x=3), is mixed with distilled water, preparing a first-2 precursor solution.

The first-1 precursor solution is supported on $Al_2O_3$ (commercial alumina) through an initial wet impregnation method, dried at 90° C. for 24 hours, and the first-2 precursor solution is supported thereon in the initial wet impregnation method and dried at 90° C. for 24 hours and then, calcinated at 500° C. for 5 hours, preparing a first catalyst (1.5Pt0.4Rh/$Al_2O_3$).

The palladium precursor, $K_2PdCl_4 \cdot 6H_2O$, is mixed with distilled water, preparing a second-1 precursor solution. In addition, a platinum precursor, $K_2PtCl_4 \cdot 6H_2O$, is mixed with distilled water, preparing a second-2 precursor solution.

The second-2 precursor solution is supported on $Al_2O_3$ (commercial alumina) in the initial wet impregnation method and dried at 90° C. for 24 hours, and the second-1 precursor solution is supported thereon in the initial wet impregnation method and dried at 90° C. for 24 hours and then, calcinated at 500° C. for 5 hours, preparing a second catalyst (0.6Pd1.5Pt/$Al_2O_3$).

The prepared first and second catalysts are physically mixed in a weight ratio of 1:1, preparing a catalyst for purifying exhaust gas.

Example 2

A catalyst for purifying exhaust gas is prepared in the same manner as in Example 1 except for the contents of platinum and rhodium are adjusted to prepare 1.2Pt0.4Rh/$Al_2O_3$ as the first catalyst, and the contents of palladium and platinum are adjusted to prepare 1.3Pd1.2Pt/$Al_2O_3$ as the second catalyst.

Example 3

A catalyst for purifying exhaust gas is prepared in the same manner as in Example 1 except for the contents of platinum and rhodium are adjusted to prepare 0.7Pt0.4Rh/$Al_2O_3$ as the first catalyst, and the contents of palladium and platinum are adjusted to prepare 2.2Pd0.7Pt/$Al_2O_3$ as the second catalyst.

Comparative Example 1

A platinum precursor, $K_2PtCl_4 \cdot 6H_2O$, is mixed with distilled water, preparing a platinum precursor solution.

The precursor solution is supported on $Al_2O_3$ (commercial alumina) in the initial wet impregnation method and dried at 90° C. for 24 hours and then, calcinated at 500° C. for 5 hours, preparing a catalyst for purifying exhaust gas (2.0Pt/$Al_2O_3$).

Comparative Example 2

A palladium precursor, $K_2PdCl_4 \cdot 6H_2O$, and a rhodium precursor, $RhCl_3 \cdot x(H_2O)$ (x=3), are mixed with distilled water, preparing a mixed precursor solution.

The precursor solution is supported on $Al_2O_3$ (commercial alumina) in the initial impregnation method and dried at 90° C. for 24 hours and then, calcinated at 500° C. for 5 hours, preparing a catalyst for purifying exhaust gas (1.8Pd0.2Rh/$Al_2O_3$).

Compositions of the catalysts of Examples 1 to 3 and Comparative Examples 1 to 2 are provided in Table 1.

TABLE 1

| | | Second catalyst (wt. %) | | First catalyst (wt. %) | | Total weight ratio | After mixing (wt. %) | | |
|---|---|---|---|---|---|---|---|---|---|
| | Catalyst composition | Pd | Pt | Pt | Rh | | Pd | Pt | Rh |
| Ex. 1 | 0.6Pd1.5Pt/$Al_2O_3$ + 1.5Pt0.4Rh/$Al_2O_3$ | 0.6 | 1.5 | 1.5 | 0.4 | 1:1 | 0.3 | 1.5 | 0.2 |
| Ex. 2 | 1.3Pd1.2Pt/$Al_2O_3$ + 1.2Pt0.4Rh/$Al_2O_3$ | 1.3 | 1.2 | 1.2 | 0.4 | 1:1 | 0.6 | 1.2 | 0.2 |
| Ex. 3 | 2.2Pd0.7Pt/$Al_2O_3$ + 0.7Pt0.4Rh/$Al_2O_3$ | 2.2 | 0.7 | 0.7 | 0.4 | 1:1 | 1.1 | 0.7 | 0.2 |
| Comp. Ex. 1 | 2.0Pt/$Al_2O_3$ | None | None | 2.0 | None | None | None | 2.0 | None |
| Comp. Ex. 2 | 1.8Pd0.2Rh/$Al_2O_3$ | 1.8 | None | None | 0.2 | None | 1.8 | None | 0.8 |

Experimental Example 2: Measurement of Exhaust Gas Purification Performance

The catalysts of Examples 1 to 3 and Comparative Examples 1 to 2 are measured with respect to exhaust gas purification performance, and the results are shown in Tables 3 and 4.

Table 3 is a graph showing the gasoline exhaust gas purification performance results of the catalysts of Examples 1 to 3 and Comparative Examples 1 to 2 before the heat treatment, and Table 4 is a graph showing the gasoline exhaust gas purification performance results of the catalysts of Examples 1 to 3 and Comparative Examples 1 to 2 after the heat treatment The catalysts of Examples 1 to 3 and Comparative Examples 1 to 2 are heat-treated at 950° C. for 30 hours.

The exhaust gas purification performance of the catalysts is evaluated under the following conditions shown in Table 2.

TABLE 2

| $H_2O$ | $CO_2$ | NO | C1 ($C_3H_6:C_3H_8$ = 4:1) | $O_2$ | CO | $H_2$ | $\lambda$ |
|---|---|---|---|---|---|---|---|
| 10% | 13.9% | 1000 ppm | 1650 ppm | 0.6% | 0.6% | 0.2% | 1.00 |

Tables 3 and 4 show the $T_{50}$ results of Co, No, $C_3H_6$, and $C_3H_8$. $T_{50}$ indicates a temperature that each content of Co, No, $C_3H_6$, and $C_3H_8$ is reduced to 50%.

TABLE 3

|  | Comparative Example 1 | Example 1 | Example 2 | Example 3 | Comparative Example 2 |
|---|---|---|---|---|---|
| CO | 308 | 209 | 219 | 246 | 225 |
| NO | 357 | 260 | 273 | 270 | 210 |
| $C_3H_6$ | 358 | 282 | 286 | 296 | 270 |
| $C_3H_8$ | 365 | 303 | 291 | 300 | 283 |

TABLE 4

|  | Comparative Example 1 | Example 1 | Example 2 | Example 3 | Comparative Example 2 |
|---|---|---|---|---|---|
| CO | 367 | 240 | 240 | 246 | 304 |
| NO | 408 | 235 | 248 | 270 | 368 |
| $C_3H_6$ | 399 | 279 | 290 | 296 | 335 |
| $C_3H_8$ | 397 | 288 | 292 | 300 | 351 |

Referring to Table 3, the catalyst (1.8Pd0.2Rh/$Al_2O_3$) of Comparative Example 2 exhibits excellent performance before the heat treatment, but the catalyst (2.0Pt/$Al_2O_3$) of Comparative Example 1 exhibits the lowest performance. On the other hand, the catalysts of Examples 1 to 3 before the heat treatment exhibit performance at an intermediate level middle between the catalysts of Comparative Examples 1 and 2.

Referring to Table 4, after the heat treatment, like the catalyst of Comparative Example 2 (1.8Pd0.2Rh/$Al_2O_3$), when palladium and rhodium are present on $Al_2O_3$ at the same time, the catalyst exhibits performance degradation after deterioration. In addition, like the catalyst (2.0Pt/$Al_2O_3$) of Comparative Example 1, when platinum alone is used, the catalyst exhibits performance degradation after deterioration.

On the contrary, like the catalysts of Examples 1 to 3, when palladium and rhodium are separately supported, and platinum is additionally supported, which are mixed to prepare catalysts, the catalysts exhibit excellent exhaust gas purification performance after deterioration, compared with the catalysts of Comparative Examples 1 and 2.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A catalyst for purifying exhaust gas, the catalyst comprising:
    a first catalyst including a first metal oxide on which platinum (Pt) and rhodium (Rh) are supported; and
    a second catalyst including a second metal oxide on which palladium (Pd) and platinum (Pt) are supported,
    wherein the first catalyst and the second catalyst are physically mixed,
    wherein the first catalyst comprises 0.7 wt. % to 1.5 wt. % of platinum and 0.1 wt. % to 1.0 wt. % of rhodium based on a total weight of the first catalyst, and
    wherein the second catalyst comprises 0.6 wt. % to 2.2 wt. % of palladium and 0.7 wt. % to 1.5 wt. % of platinum based on a total weight of the second catalyst.

2. The catalyst of claim 1, wherein the first metal oxide and the second metal oxide each independently comprise aluminum oxide ($Al_2O_3$), titanium dioxide ($TiO_2$), silicon dioxide ($SiO_2$), zirconium dioxide ($ZrO_2$), tin oxide ($SnO_2$), tantalum oxide ($Ta_2O_5$), hafnium oxide ($HfO_2$), lanthanum oxide ($La_2O_3$), vanadium pentoxide ($V_2O_5$), cerium oxide ($CeO_2$), iron oxide ($Fe_2O_3$), chromium oxide ($Cr_2O_3$), molybdenum trioxide ($MoO_3$), zinc oxide (ZnO), magnesium oxide (MgO), tungsten trioxide ($WO_3$), or a combination thereof.

3. The catalyst of claim 1, wherein the platinum and the rhodium of the first catalyst and the palladium and the platinum of the second catalyst are not supported together on one metal oxide.

4. The catalyst of claim 1, wherein a weight ratio of the first catalyst and the second catalyst is greater than 1:0 and less than 1:2.

5. The catalyst of claim 1, wherein a weight ratio of platinum and palladium within the catalyst is greater than 1:0 and less than 1:2.

6. The catalyst of claim 1, wherein the catalyst has been heat-treated at a temperature in a range of 800° C. to 1100° C. for 5 hours to 500 hours.

7. A method of manufacturing a catalyst for purifying exhaust gas, the method comprising:
    preparing a first catalyst by supporting platinum (Pt) and rhodium (Rh) on a first metal oxide;
    preparing a second catalyst by supporting palladium (Pd) and platinum (Pt) on a second metal oxide; and
    physically mixing the first catalyst and the second catalyst to provide the catalyst for purifying the exhaust gas,
    wherein the first catalyst comprises 0.7 wt. % to 1.5 wt. % of platinum and 0.1 wt. % to 1.0 wt. % of rhodium based on a total weight of the first catalyst, and
    wherein the second catalyst comprises 0.6 wt. % to 2.2 wt. % of palladium and 0.7 wt. % to 1.5 wt. % of platinum based on a total weight of the second catalyst.

8. The method of claim 7, wherein the preparing of the first catalyst comprises: impregnating the first metal oxide in a solution including a precursor of platinum and a precursor of rhodium; and calcining the impregnated solution.

9. The method of claim 8, wherein the calcining is performed at a temperature in a range of 300° C. to 700° C. for 2 hours to 24 hours.

10. The method of claim 7, wherein the preparing of the second catalyst comprises: impregnating the second metal oxide in a solution including a precursor of palladium and a precursor of platinum; and calcining the impregnated solution.

11. The method of claim 10, wherein the calcining is performed at a temperature in a range of 300° C. to 700° C. for 2 hours to 24 hours.

12. The method of claim 7, further comprising, after physically mixing the first catalyst and the second catalyst: heat-treating the catalyst at a temperature in a range of 800° C. to 1100° C. for 5 hours to 500 hours.

\* \* \* \* \*